United States Patent
Zhu et al.

(10) Patent No.: US 9,109,350 B2
(45) Date of Patent: Aug. 18, 2015

(54) FLUID DELIVERY SYSTEM WITH A HOUSING AND AT LEAST ONE FLUID INLET AND ONE FLUID OUTLET

(71) Applicant: Xiamen Lota International Co., Ltd., Xiamen (CN)

(72) Inventors: Chunanbao Zhu, Xiamen (CN); Liming Ye, Xiamen (CN); Bentai Chen, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 266 days.

(21) Appl. No.: 13/740,978

(22) Filed: Jan. 14, 2013

(65) Prior Publication Data

US 2013/0186478 A1    Jul. 25, 2013

Related U.S. Application Data

(60) Provisional application No. 61/589,096, filed on Jan. 20, 2012.

(51) Int. Cl.
*E03C 1/06* (2006.01)
*E03C 1/04* (2006.01)
*F16L 3/00* (2006.01)

(52) U.S. Cl.
CPC ............. *E03C 1/06* (2013.01); *E03C 1/0403* (2013.01); *F16L 3/00* (2013.01); *E03C 1/0401* (2013.01); *Y10T 137/0402* (2015.04); *Y10T 137/598* (2015.04)

(58) Field of Classification Search
CPC ........... F16L 11/22; F16L 11/14; F16L 33/24; F16L 33/003; F16L 33/006; F16L 3/00; E03C 1/06; E03C 1/0403; E03C 1/0401; E03C 1/0402

USPC ............................................. 137/315.12, 801
See application file for complete search history.

(56) References Cited

U.S. PATENT DOCUMENTS

| | | | | |
|---|---|---|---|---|
| 2,172,073 | A | * | 9/1939 | Smith .......................... 251/360 |
| 3,854,493 | A | | 12/1974 | Farrell |
| 3,911,946 | A | | 10/1975 | Humpert et al. |
| 4,103,709 | A | | 8/1978 | Fischer |
| 4,262,699 | A | | 4/1981 | Fabian |
| 4,667,987 | A | | 5/1987 | Knebel |
| 5,010,922 | A | | 4/1991 | Agresta |
| 5,348,048 | A | | 9/1994 | Schirado et al. |
| 5,797,151 | A | | 8/1998 | Ko |
| 5,931,200 | A | | 8/1999 | Mulvey et al. |

(Continued)

FOREIGN PATENT DOCUMENTS

| | | |
|---|---|---|
| CA | 2752177 A1 | 9/2010 |
| CN | 102333965 A | 1/2012 |

(Continued)

*Primary Examiner* — Kevin Lee
(74) *Attorney, Agent, or Firm* — McDermott Will & Emery LLP

(57) ABSTRACT

The invention provides a fluid delivery assembly for use with a water discharge fixture, such as a faucet. The fluid delivery assembly includes a tube assembly, a cartridge housing and a retaining assembly. The fluid delivery assembly provides for water flow from hot and cold water inlets to the faucet. The fluid delivery assembly may be assembled by hand without the need for tools, allowing for easy replacement of the fluid delivery assembly without the need to disassemble the faucet assembly or to replace the entire faucet assembly.

3 Claims, 14 Drawing Sheets

(56) References Cited

U.S. PATENT DOCUMENTS

| | | |
|---|---|---|
| 5,937,892 A | 8/1999 | Meisner et al. |
| 5,983,923 A | 11/1999 | Hobbs et al. |
| 6,073,972 A | 6/2000 | Rivera |
| 6,085,784 A | 7/2000 | Bloom et al. |
| 6,106,027 A | 8/2000 | Mulvey et al. |
| 6,123,106 A | 9/2000 | Benstead |
| 6,170,515 B1 | 1/2001 | Peterson et al. |
| 6,195,818 B1 | 3/2001 | Rodstein et al. |
| 6,328,067 B1 | 12/2001 | Hsiung |
| 6,360,770 B1 | 3/2002 | Buchner et al. |
| 6,405,749 B1 | 6/2002 | Bloom et al. |
| 6,434,765 B1 * | 8/2002 | Burns et al. ............ 4/676 |
| 6,641,177 B1 | 11/2003 | Pinciaro |
| 6,684,906 B2 | 2/2004 | Burns et al. |
| 6,725,472 B2 | 4/2004 | Gray et al. |
| 6,820,291 B1 | 11/2004 | Weaver |
| 6,912,742 B1 | 7/2005 | Wang |
| 7,032,260 B2 | 4/2006 | Hwang |
| 7,039,966 B1 | 5/2006 | Cranston, Jr. |
| 7,043,777 B2 | 5/2006 | Bloom et al. |
| 7,055,545 B2 | 6/2006 | Mascari et al. |
| 7,077,153 B2 | 7/2006 | Segien, Jr. |
| 7,162,755 B2 | 1/2007 | Mintz et al. |
| 7,207,075 B2 | 4/2007 | Peterson et al. |
| 7,210,493 B1 | 5/2007 | Wang |
| 7,231,936 B2 | 6/2007 | Chang |
| 7,269,864 B2 | 9/2007 | Brown et al. |
| 7,313,834 B2 | 1/2008 | Tan et al. |
| 7,373,674 B1 | 5/2008 | Condon |
| 7,387,137 B2 | 6/2008 | Chung |
| 7,404,413 B2 | 7/2008 | Chang |
| 7,406,980 B2 | 8/2008 | Pinette |
| 7,415,991 B2 | 8/2008 | Meehan et al. |
| 7,578,309 B2 | 8/2009 | Breda |
| 7,647,939 B2 * | 1/2010 | Lin ............ 137/315.12 |
| 7,658,202 B2 * | 2/2010 | Mueller et al. ............ 137/315.12 |
| 7,698,755 B2 | 4/2010 | McNerney et al. |
| 7,766,043 B2 | 8/2010 | Thomas et al. |
| 7,814,927 B2 | 10/2010 | Hansen |
| 7,819,137 B2 | 10/2010 | Nelson et al. |
| 7,896,025 B2 | 3/2011 | Hanson |
| 7,971,742 B2 | 7/2011 | Kreider |
| 7,979,929 B2 | 7/2011 | Vogel et al. |
| 8,011,384 B2 | 9/2011 | Izzy et al. |
| 8,061,386 B2 | 11/2011 | Mueller et al. |
| 2004/0143900 A1 | 7/2004 | Nelson et al. |
| 2005/0063772 A1 | 3/2005 | Bladen |
| 2005/0098221 A1 | 5/2005 | Mascari et al. |
| 2005/0138725 A1 | 6/2005 | Hwang |
| 2006/0101576 A1 | 5/2006 | Rhodes |
| 2006/0117477 A1 * | 6/2006 | Rosko ............ 4/676 |
| 2008/0178957 A1 | 7/2008 | Thomas et al. |
| 2008/0196776 A1 | 8/2008 | Ko |
| 2008/0277611 A1 | 11/2008 | Esche et al. |
| 2009/0000026 A1 | 1/2009 | Hanson |
| 2009/0001310 A1 | 1/2009 | Hanson |
| 2009/0032170 A1 | 2/2009 | Williams |
| 2010/0125946 A1 | 5/2010 | Meisner et al. |
| 2010/0155505 A1 | 6/2010 | Lopp et al. |
| 2010/0170578 A1 | 7/2010 | Liu et al. |
| 2010/0200613 A1 | 8/2010 | Smith et al. |
| 2011/0115219 A1 | 5/2011 | Biris et al. |
| 2011/0297248 A1 | 12/2011 | Nelson et al. |
| 2012/0228871 A1 * | 9/2012 | Li ............ 285/307 |

FOREIGN PATENT DOCUMENTS

| | | |
|---|---|---|
| EP | 2401513 A1 | 1/2012 |
| MX | 2011008426 A | 9/2011 |
| WO | WO-2008086379 A1 | 7/2008 |
| WO | WO-2010099397 A1 | 9/2010 |
| WO | WO-2011155904 A1 | 12/2011 |

* cited by examiner

FLUID DELIVERY SYSTEM WITH A HOUSING AND AT LEAST ONE FLUID INLET AND ONE FLUID OUTLET

RELATED APPLICATION

The present application for patent claims priority under 35 U.S.C. §119 to Provisional Application No. 61/589,096 entitled "FLUID DELIVERY ASSEMBLY" filed Jan. 20, 2012 ("the Provisional application"). The Provisional application is assigned to the assignee of the present application, and is hereby expressly incorporated by reference.

TECHNICAL FIELD

The invention relates to a fluid delivery assembly that is installed in a water discharging fixture, such as a faucet. The fluid delivery assembly includes a tube assembly defining a fluid flow path, a housing configured to receive a fluid flow cartridge, and a retaining assembly that enables the fluid delivery assembly to be easily removed or replaced.

BACKGROUND OF THE INVENTION

Fluid delivery assemblies are known, and can be found in both residential and commercial settings. In either setting, the fluid delivery assembly provides fluid flow from hot and cold water sources. The fluid is dispensed through a discharge fixture, such as a kitchen or lavatory faucet. While such fluid delivery assemblies provide some benefits, they nevertheless have certain limitations. For example, the water delivery lines attached between the water source lines and the faucet typically require tools for installation of the faucet assembly. Also, conventional fluid delivery assemblies typically have inlet lines molded together or pre-formed with a cartridge housing, such that replacing the inlet lines requires replacing the entire faucet assembly. Examples of fluid delivery assemblies having these and other limitations are found in U.S. Pat. No. 7,032,260 to Hwang and U.S. Pat. No. 6,123,106 to Benstead.

The present invention is intended to solve the limitations of conventional fluid delivery assemblies discussed above and other problems, and to provide advantages and aspects not provided by prior fluid delivery assemblies. Some of the features and advantages of the present invention are described in the following detailed description and the accompanying drawings.

SUMMARY OF THE INVENTION

The present invention is directed to a fluid delivery assembly that includes a number of components that interact to define a replaceable fluid flow path from a fluid source (such as a hot and cold water source) to a fluid discharge assembly (such as a faucet). These interacting components may include a tube assembly (e.g., a plastic tube assembly), a housing (e.g., a cartridge housing), and a retaining assembly (e.g., a threaded mounting shank and a cooperatively threaded mounting nut). These components enable the fluid delivery assembly to be easily attached to or detached from a faucet assembly by hand, that is, without the use of tools. These components may be separate and distinct such that an individual component may be removed and/or replaced.

An important feature of the invention is that its fluid delivery assembly is mounted completely below its related countertop or deck. It follows that the installation or removal of the fluid delivery assembly occurs completely below the countertop or deck. This permits such installation or removal of the fluid delivery assembly without removing or replacing portions of the faucet assembly above the deck.

According to one aspect of the invention, the fluid delivery assembly includes a tube assembly having a plurality of tubes, a housing configured to receive a fluid flow cartridge assembly, and a retaining assembly. The tube assembly may be formed of any suitable material, including but not limited to PERT. The tube assembly may include two tubes, the first tube providing water from a water source line to the cartridge housing and the second tube providing a water pathway from the cartridge housing to a water discharge assembly, such as a faucet. Alternatively, the first tube may provide hot water from the hot water source line to the cartridge housing, and the second tube may provide cold water from the cold water source line to the cartridge housing.

An end portion of the first tube may be sized and/or shaped differently than an end portion of the second tube. Correspondingly, the housing may have two mating cavities that are sized and shaped to receive the complementarily sized and shaped end portions of the respective first and second tubes. As a consequence of this construction, the tube assembly may only be inserted into the housing in one particular orientation.

The retaining assembly includes a securing member that has a threaded portion. The securing member is movable up and down a portion of the length of the tube assembly, and is also rotationally movable around the circumference of the tube assembly. The retaining assembly also includes a mounting member that has a threaded portion. As the securing member is rotated by hand, the threaded portions of the securing member and the mounting member cooperatively engage with each other to secure the tube assembly to the housing. The securing member and the mounting member include sufficient threading to ensure a precise and well-sealed connection between the tube assembly and the end body. Preferably, the securing member is externally threaded and the end body is internally threaded. Alternatively, the securing member may be internally threaded and the end body may be externally threaded. The housing, the tube assembly and the retaining assembly are separate components that are not integrally formed together, such as by over-molding or adhesively bonding. Therefore, any component may be removed and/or replaced while keeping the other components as part of the faucet assembly.

Other features and advantages of an aspect of the invention will be apparent from the following specification, taken in conjunction with the following drawings.

DETAILED DESCRIPTION

This invention may take many different forms. The current description and drawings teach only a few of the many different forms or embodiments of the invention. It should be understood that the present disclosure is to be considered as disclosing only a few, non-limiting examples of the principles of the invention. This disclosure is not intended to limit the broadest aspects of the invention to the illustrated embodiments.

Figure 1:
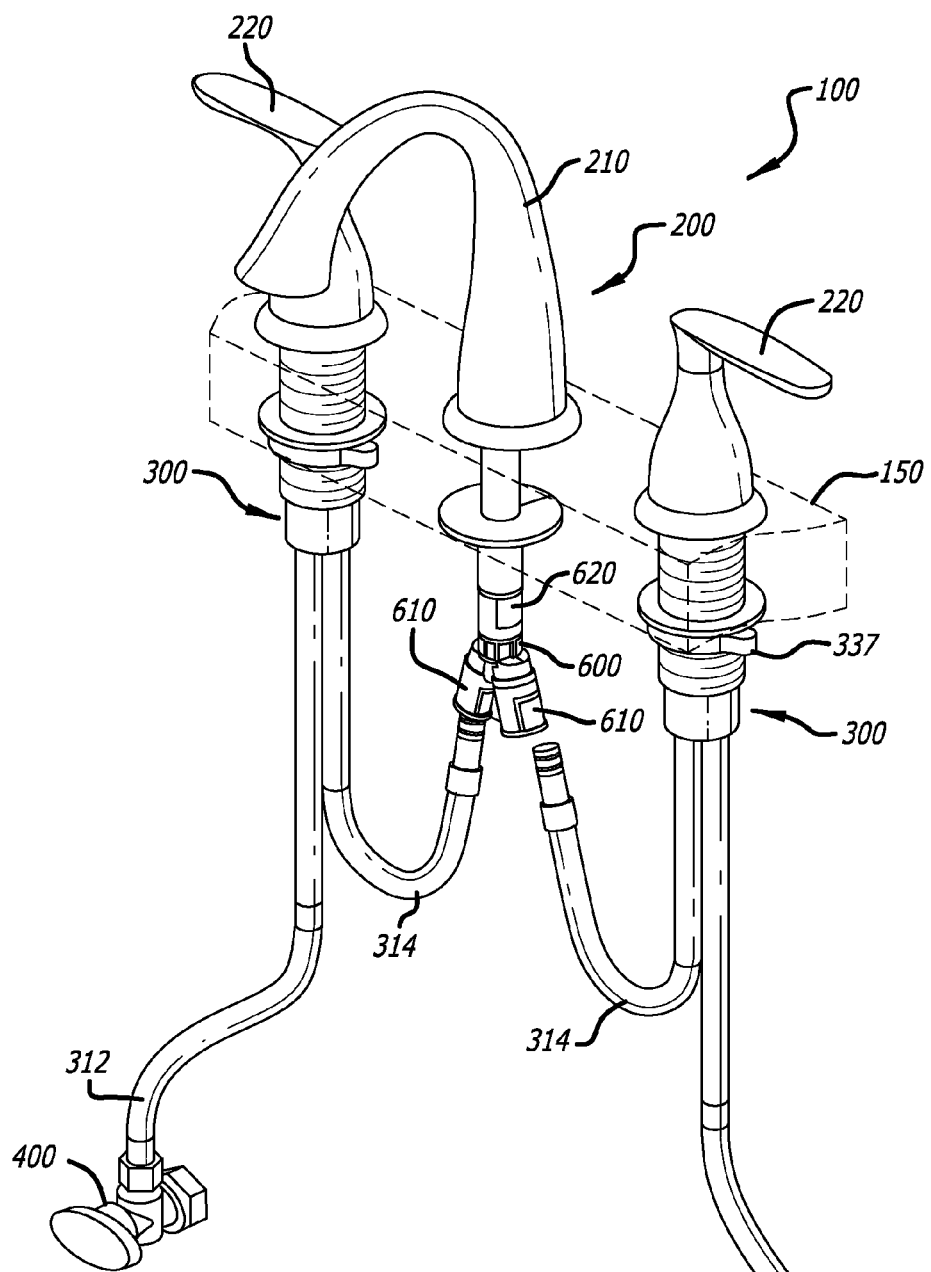
FIG. 1 is a perspective view of the invention, connected to a faucet, to form an assembly.

FIG. 1 illustrates a faucet system 100 for delivery of water to a user. The faucet system 100 includes a faucet assembly 200, a quick connect assembly 600, fluid delivery assemblies 300 and fluid inlet valves 400. The faucet assembly 200 includes a delivery spout 210 and two handles 220 that are mounted as an assembly on top of a countertop 150 (shown in broken line form). The fluid delivery assemblies 300 are connected between the faucet assembly 200 and the fluid inlet valves 400. One inlet valve 400 may provide hot water from a hot water source (e.g., water heater) and the other inlet valve 400 may provide cold water from a cold water source (e.g., well or city water). Alternatively, faucet system 100 may be any other suitable fluid delivery system (e.g., a shower system).

Figure 2:
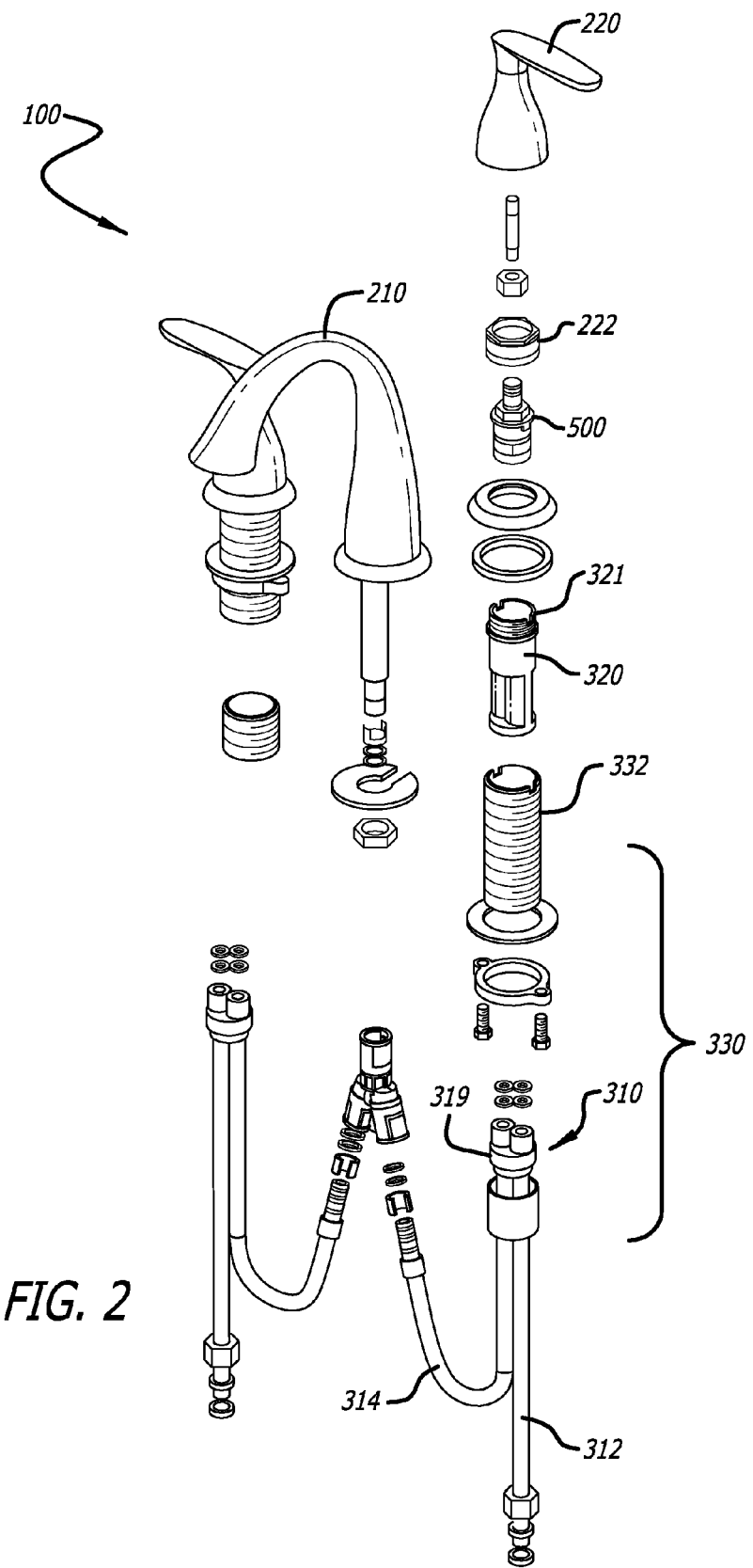
FIG. 2 is an exploded perspective view of the assembly of FIG. 1, with two fluid delivery assemblies shown positioned for assembly with the faucet.

FIG. 2 illustrates an exploded view of the faucet assembly 200 and the fluid delivery assembly 300. As explained in greater detail below, each fluid delivery assembly 300 includes a tube assembly 310 defining a flow path for hot or cold water, a housing 320 and a retaining assembly 330. Alternatively, the fluid delivery assembly 300 may include only the tube assembly 310 and the retaining assembly 330.

Referring again to FIG. 2, the tube assembly 310 includes a first tube 312 that provides a fluid pathway from a fluid source inlet line, such as a hot or cold water inlet line. A portion of a second tube 314 of the tube assembly 310 runs alongside and is substantially parallel to first tube 312. As may be seen in FIG. 2, this second tube 314 provides a fluid pathway from the housing 320 to a fluid delivery spout 210, such as a water faucet.

Figure 4:
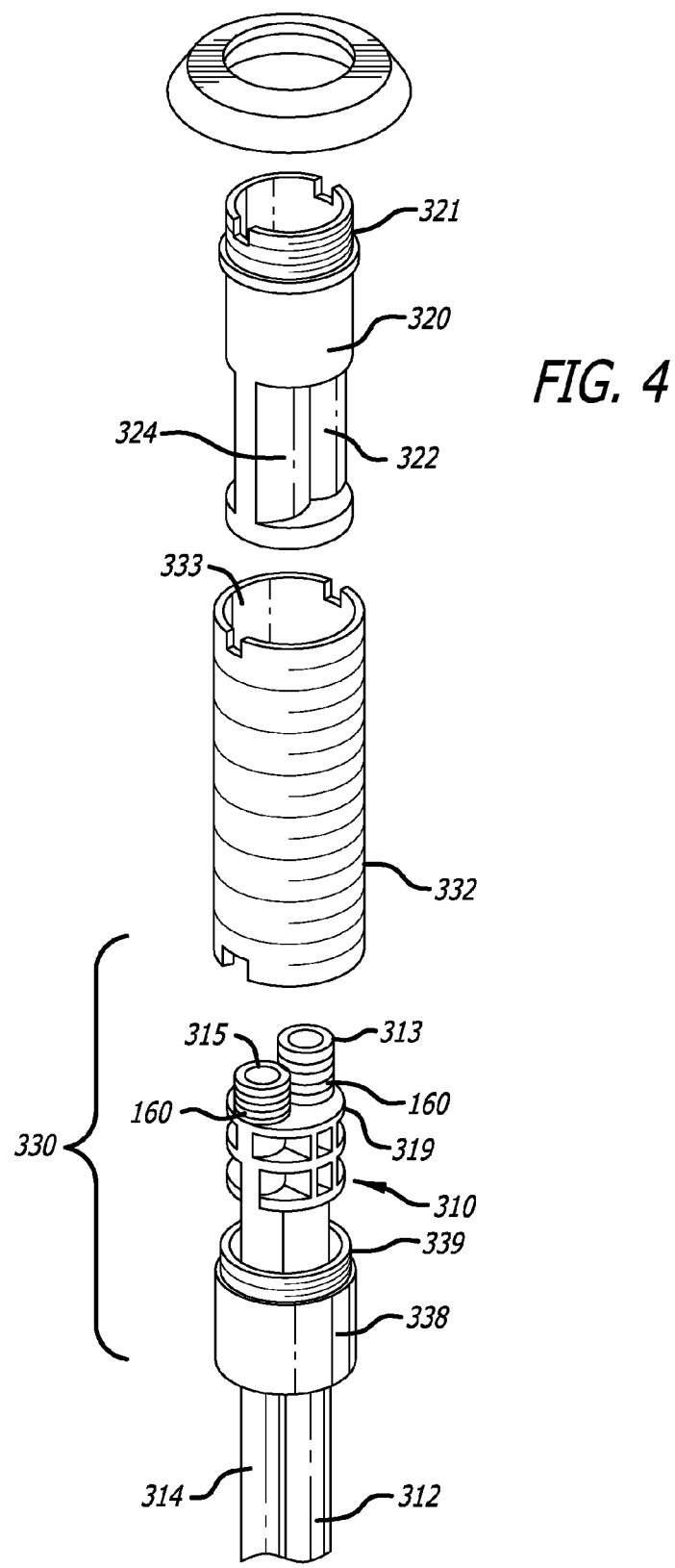
FIG. 4 is an exploded perspective view of a fluid delivery assembly.

In this embodiment, as may be seen in FIGS. 2 and 4, parts of first tube 312 and second tube 314 are molded together at a molded junction portion 319. Alternatively, the first and second tubes 312, 314 may be attached to each other by any standard attachment device, such as by a clamp, a band or an adhesive.

FIG. 4 shows that the first tube 312 has a first tube end portion 313, and that second tube 314 has a second tube end portion 315. First tube end portion 313 may be sized and/or shaped differently than second tube end portion 315. As but one example, both tube end portions 313, 315 may be cylindrical, but the first tube end portion 313 may have a larger diameter than the second tube end portion 315.

The present fluid delivery assembly may include the housing 320 depicted in FIG. 4. The housing 320 is configured to accommodate the tube end portions of the first tube 312 and second tube 314. For example, as noted above, the first tube end portion 313 has a larger diameter than the second tube end portion 315. Accordingly, the housing 320 of FIG. 4 includes a relatively large first fluid channel 322, sized and shaped to properly accommodate the larger first tube end portion 313. Housing 320 further includes a relatively smaller second fluid channel 324, sized and shaped to properly accommodate the smaller second tube end portion 315

The first and second fluid channels 322 and 324 are intended and designed in a manner that will ensure secure a snug or tight fit. As a result, the design of the first and second fluid channels 322 and 324 provides retention of the first 313 and second 315 tube end portions within those fluid channels. Such secure retention prevents unintended separation of the first end portion 313 from the first fluid channel 322, and of the second end portion 315 from the second fluid channel 324.

The connection between the first and second fluid channels 322 and 324 and the end portions 313 and 315 is also intended to be water-tight. Such a water-tight connection arises from the provision of at least one sealing member 160 mounted on each tube end portion 313, 315. One example of a preferred sealing member 160 is a conventional, elastic O-ring.

The different sizes (in this embodiment, diameters) of the tube end portions 313, 315 and their respective fluid channels 322, 324 ensures that the tube assembly 310 can only be inserted into the housing 320 in the proper orientation. Specifically, the diameter of the first tube end portion 313 is too large to fit into the second fluid channel 324.

In addition, the diameter of the second tube end portion 315 is relatively small. Thus, if the user attempted to insert the smaller second tube end portion 315 into the larger first fluid channels 322, the user would immediately notice that the second tube end portion 315 fits extremely loosely within that fluid channel 322. In this way, the user would immediately realize that he or she is attempting to position the second tube end portion 315 in the wrong fluid channel.

Instead of varying the tube end diameters, as discussed above, the tube end portions could be shaped differently. For example, one tube end portion could be round, and the other tube end portion could be square. Any combination of sizes and shapes for the tube end portions is also considered to be within the scope of this invention.

In fact, the tube end portions may also be identically sized and shaped. However, identically sized and shaped tube end portions would not enable the user to immediately know, upon attempted installation of such tube end portions into the fluid channels of a housing 320, whether those tube end portions were in the correct fluid channel.

Figure 3:
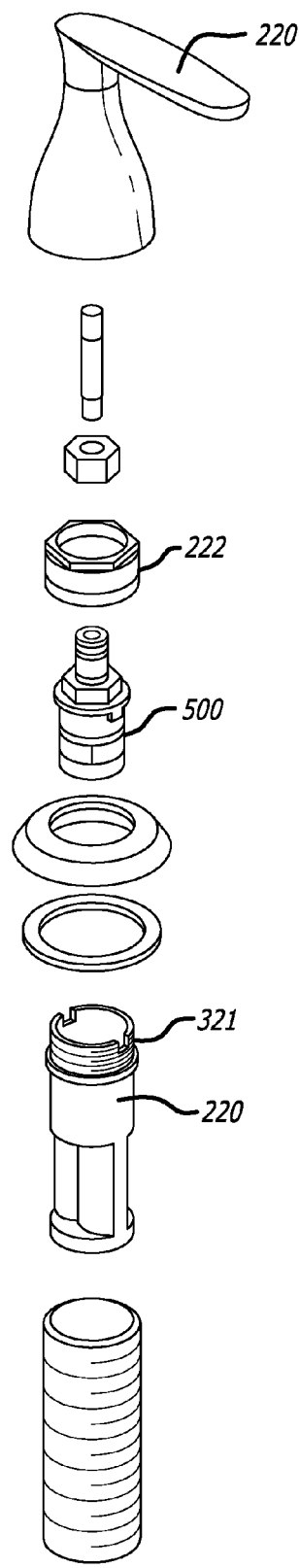
FIG. 3 is an exploded perspective view of a portion of the assembly of FIG. 1.

Fluid channels 322, 324 provide individual fluid pathways from a conventional fluid flow cartridge 500 (FIG. 3) to first and second tubes 312, 314 respectively. Housing 320 has a threaded securing portion 321 that may be secured to mounting member 332 by a securing nut 222 (see FIG. 2). Housing 320 may be formed from any desired material, such as plastic. Housing 320 may be cylindrically shaped, so as to receive a standard fluid flow cartridge 500.

Figures 5, 6:
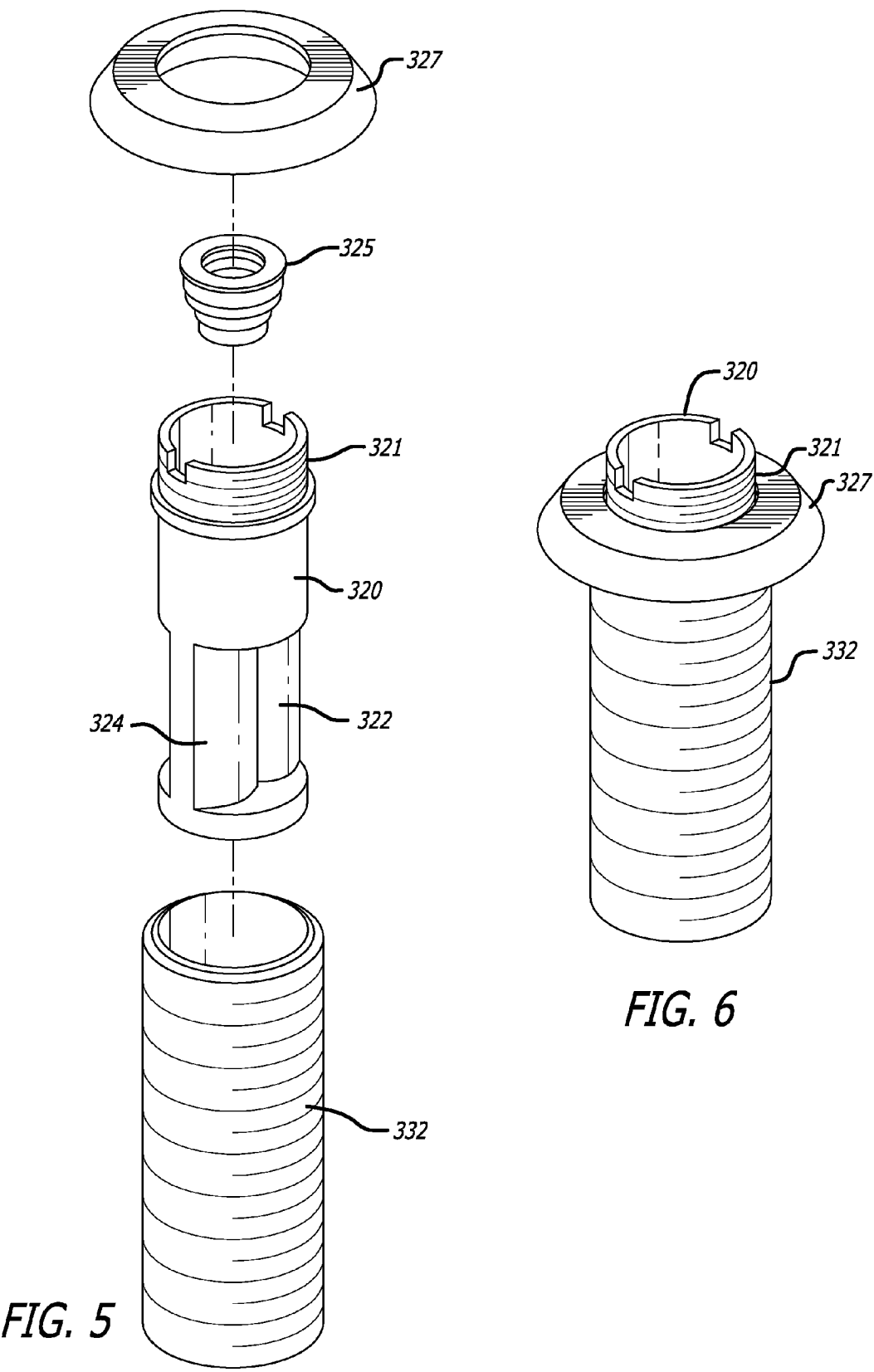
FIG. 5 is another exploded perspective view of a portion of the assembly of FIG. 1.
FIG. 6 is a perspective view of the assembled components of FIG. 5.

As show in FIGS. 5 and 6, the housing 320 is slidably inserted into the mounting member 332. A fluid orientation component 325 is slidably inserted into the housing 320. The fluid orientation component 325 connects to and seals the inlet of a fluid flow cartridge 500. The fluid orientation component 325 also connects to and seals the first fluid channel 322, which is the fluid inlet portion of the housing 320. A handle escutcheon 327 is slidably mounted onto the housing 320. The handle escutcheon 327 provides a base for the handle 220 and is a decorative cover above the countertop 150 (see FIG. 1).

Referring again to FIG. 4, the retaining assembly 330 includes a mounting member 332 and a securing member 338. While the mounting member 332 and the securing member 338 may be made of any desired material, a preferred material is either brass or copper.

Figure 7:
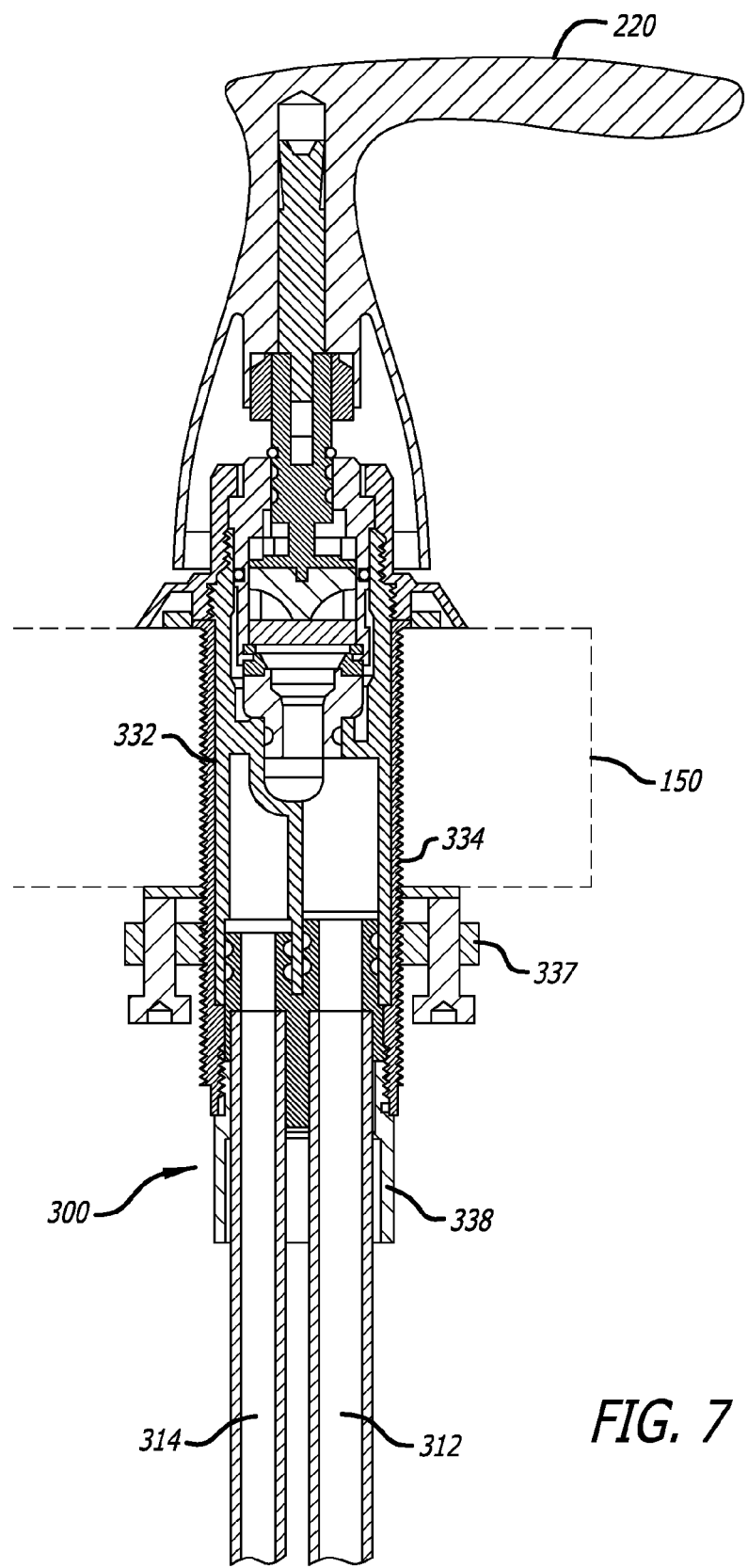
FIG. 7 is a cross-sectional front view of a portion of the assembly of FIG. 1.

The mounting member 332 is configured to be fixed in place, such as by being secured directly to a countertop or to a faucet assembly (see FIGS. 1 and 7). The mounting member 332 shown in FIG. 4 is a hollow cylindrical mounting shank 334 with external threading 336. A collar 337 may be used to secure the mounting member 332 against the bottom of a countertop 150 (see FIGS. 1 and 7).

The securing member 338 may be any suitable structure that cooperatively engages with the mounting member 332. Together, the securing member 338 and mounting member 332 act to secure the tube assembly 310 to the faucet assembly 200 such that the tube assembly 310 is connected to the housing 320.

For example, the securing member 338 may be a threaded mounting nut as shown in FIG. 4.

The mounting member 332 also has an internally threaded portion 333 (see FIG. 7). Securing member 338 has an externally threaded portion 339. Thus, the internally threaded portion 333 is attached to the externally threaded portion 339, so that the securing member 338 is connected to the mounting member 332. As indicated above, the connection of the securing member 338 to the mounting member 332 locks the tube assembly 310 into the faucet assembly 200.

Specifically, referring again to FIG. 4, the mounting member 332 is configured to receive at least a portion of the housing 320 and also at least a portion of the tube assembly 310. However, it should be understood that the housing 320 may be seated entirely within the mounting member 332. It should also be understood that the molded tube portion 319 of the tube assembly 310 may also be seated entirely within the mounting member 332.

The fluid delivery assembly 300 may be assembled by securing the mounting member 332 to the bottom of a countertop. The housing 320 is inserted into the fixed mounting member 332, and the tube assembly 310 is slidably moved into the mounting member 332 until the first and second tube end portions 313, 315 are fully engaged with first and second fluid channels 322, 324.

The securing member 338 is then slidably moved upward along the tube assembly 310, until the securing member 338 engages the mounting member 332. The securing member 338 is then rotated by hand, and not with the use of tools, to thread the securing member 332 onto the mounting member 338. As noted above, this action secures the tube assembly 310 to the faucet assembly 200. The securing nut 222 may be threaded on to the threaded securing portion 321 of the housing 320 to secure the housing 320 to the mounting member 320 and the tube assembly 310.

Referring again to FIG. 1, the first tube 312 is then connected to a fluid source, such as a hot or cold water inlet valve 400. Next, the second tube 314 is connected to a quick connect assembly 600, the quick connect assembly 600 being further connected to a fluid discharge fixture such as a water delivery spout 200. As further shown in FIG. 1, a first fluid delivery assembly 300 provides cold water to water delivery spout 200, while a second fluid delivery assembly 300 provides hot water to water delivery spout 200.

Figure 8:
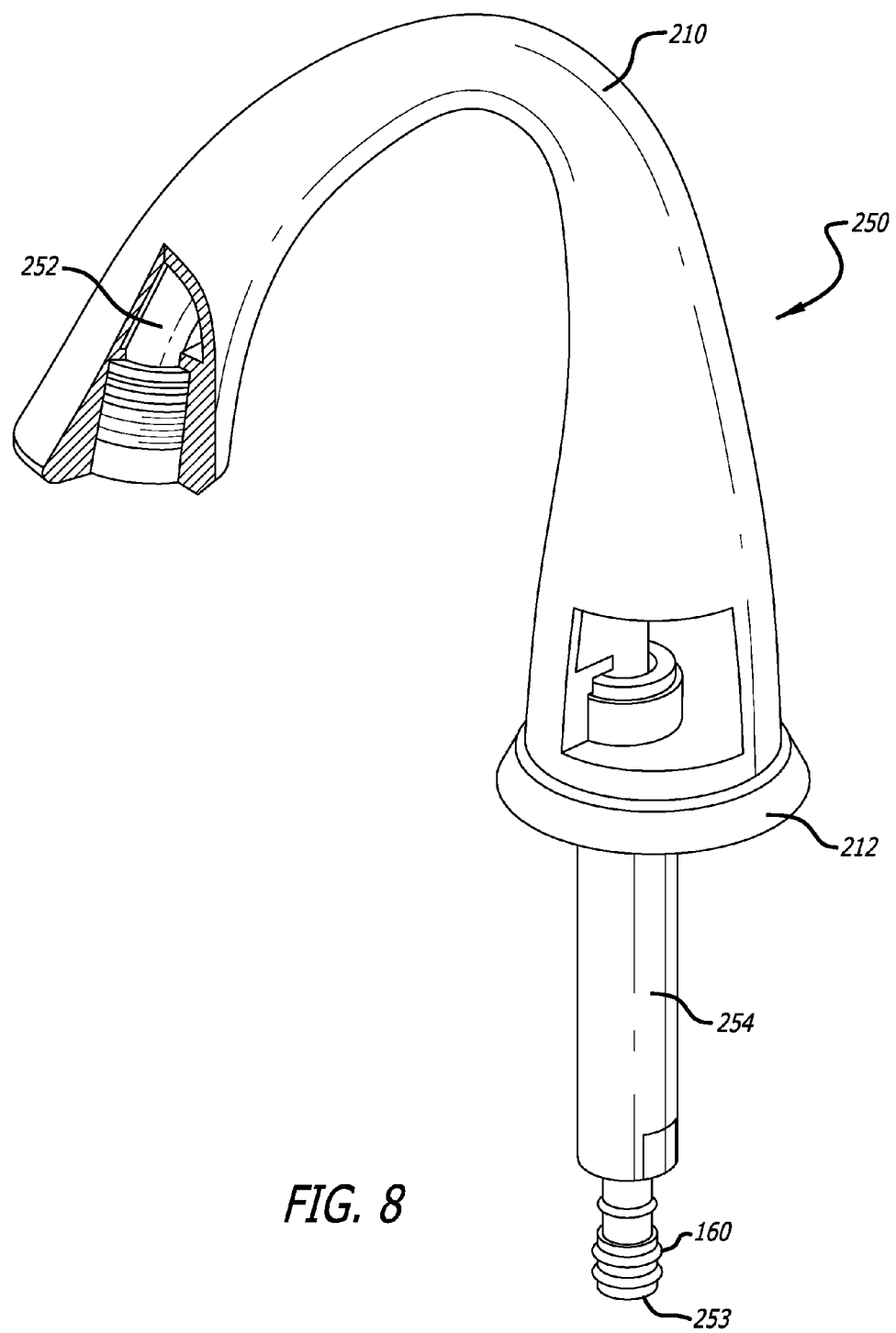
FIG. 8 is a partially cut-away perspective view of an embodiment of a delivery spout.
Figure 9:
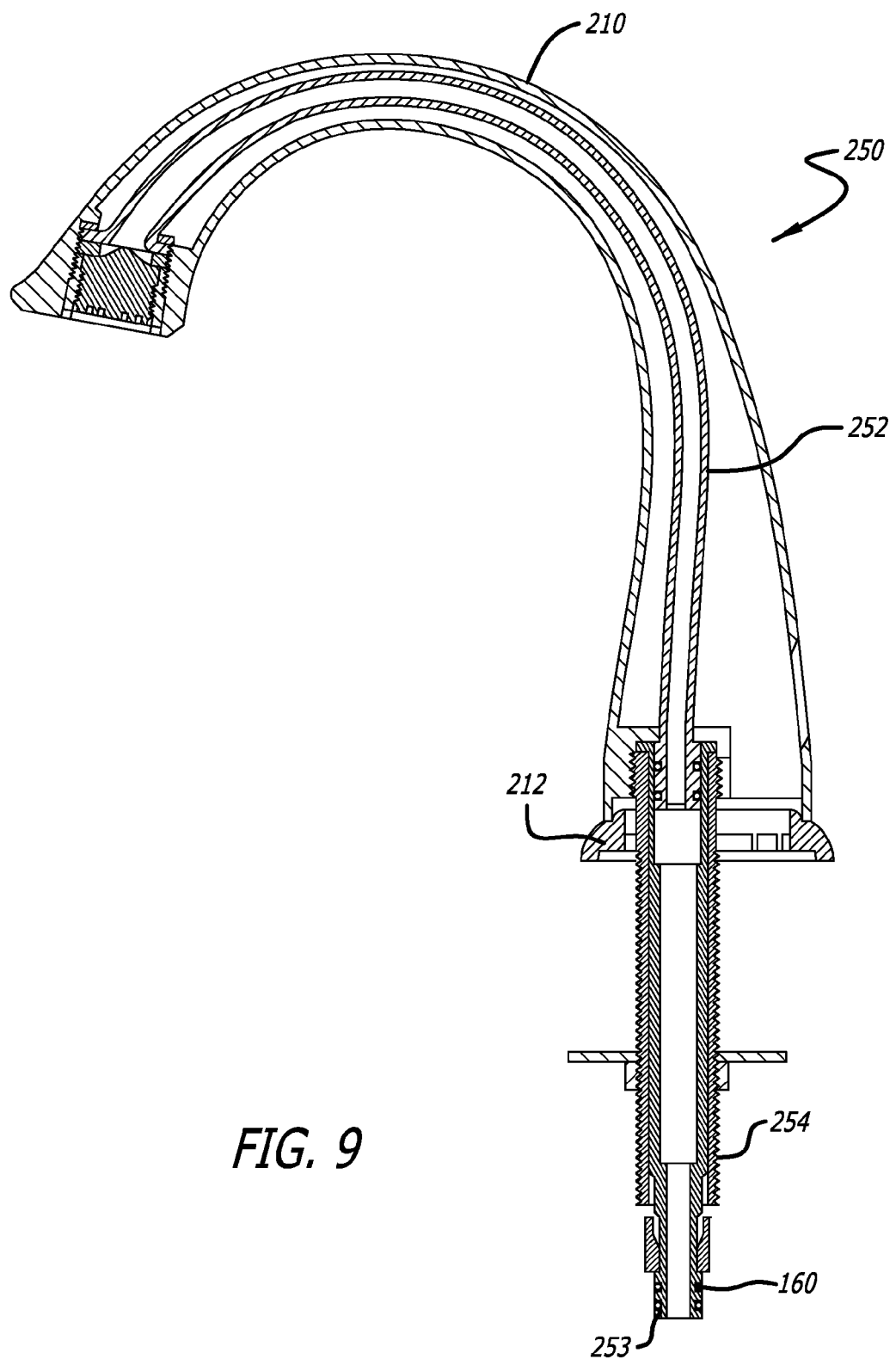
FIG. 9 is a cross-sectional side view of the delivery spout of FIG. 8.

FIGS. 8 and 9 depict a spout assembly 250. This spout assembly 250 includes a fluid delivery tube 252 that extends through at least a portion of the delivery spout 210. The base of the delivery spout 210 includes a first end 212 that is configured to be secured against the top of the countertop 150. A spout mounting member 254 extends beyond first end 212 and is configured to be mounted through a bore in the countertop 150 (see FIG. 14). As may further be seen in FIG. 14, this spout mounting member 254 may be secured to the bottom of the countertop 150 by a spout securing nut 256.

Figure 14:
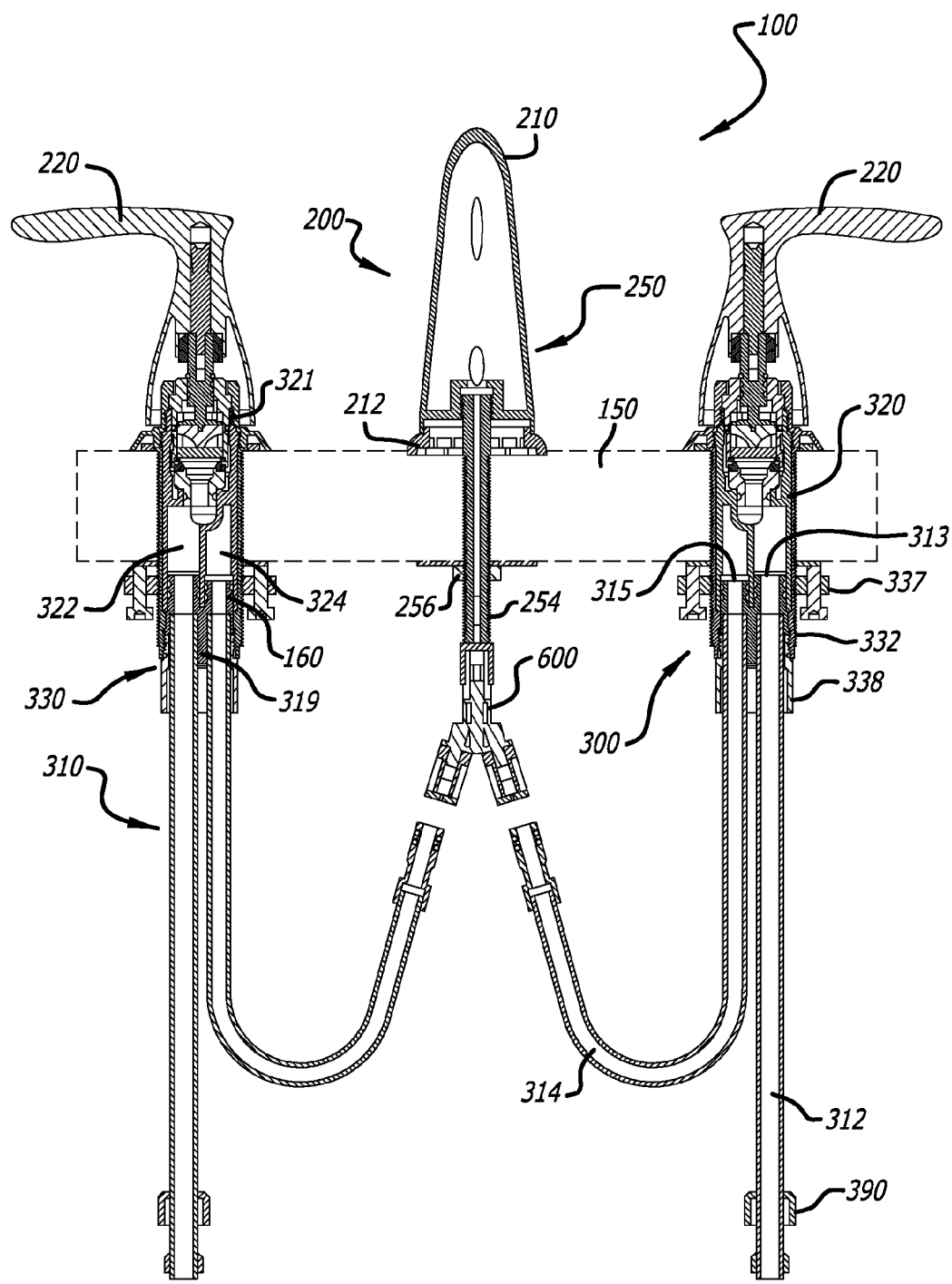
FIG. 14 is a cross-sectional front view of the assembly of FIG. 2.

As shown in FIG. 8, fluid delivery tube 252 has a first connecting end 253. First connecting end 253 is configured to connect to quick connect assembly 600 as shown in FIG. 14. The connection between first connecting end 253 and the quick connect assembly 600 is also intended to be water-tight. Such a water-tight connection arises from the provision of at least one sealing member 160 mounted on the first connecting end 253.

Referring again to FIGS. 1 and 7, retaining assembly 330 and its component tube assembly 310 are oriented along the same longitudinal axis. When the various components of the retaining assembly 330 are secured to each other, the securement arises from movement of these components along this same longitudinal axis.

For example, a standard faucet is mounted to an upper surface of a countertop 150, with a vertical bore through the countertop to accommodate the water lines from below the countertop 150. The fluid delivery assembly 300 may then be moved through this vertical bore, and then secured to the bottom of the countertop 150.

The tube assembly 310 is joined to the housing 320 from beneath the countertop 150. Then, securing member 338 is moved upwardly to the tube assembly 310, and is threaded onto the mounting member 332 to secure the tube assembly 310 to the housing 320.

In this way, all assembly of the fluid delivery assembly 300 occurs beneath the countertop. The more difficult areas to access require only hand tightening of the retaining assembly 330. Meanwhile, more accessible areas may be connected using simple tools. For example, a crescent wrench may be used to tighten a pressure fitted nut 390 to a water inlet.

Figure 10:
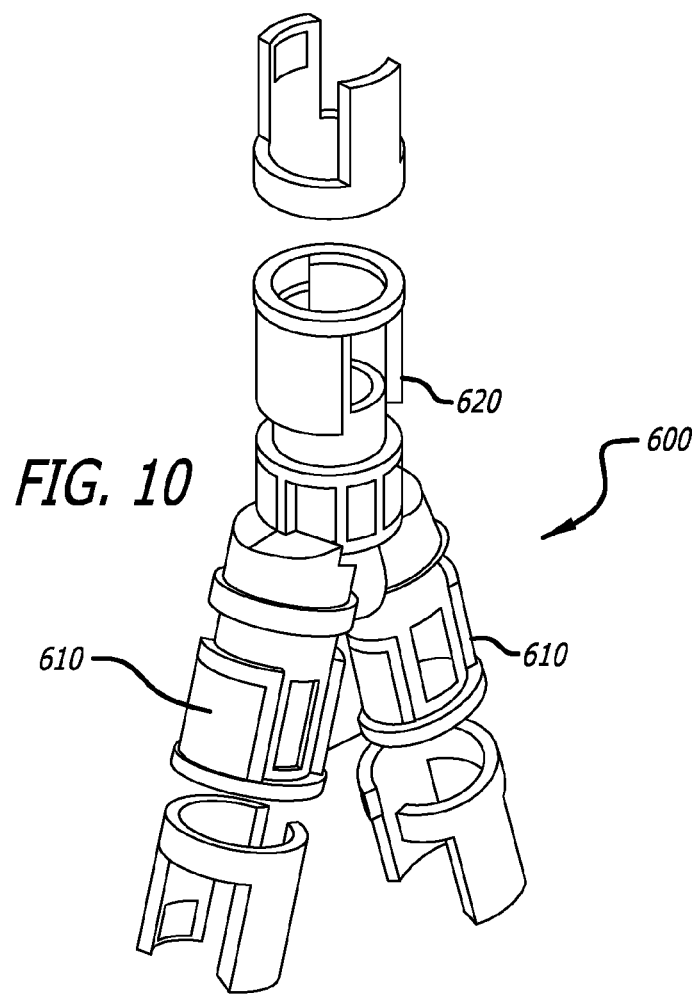
FIG. 10 is an exploded perspective view of an embodiment of a quick connect assembly.
Figure 11:
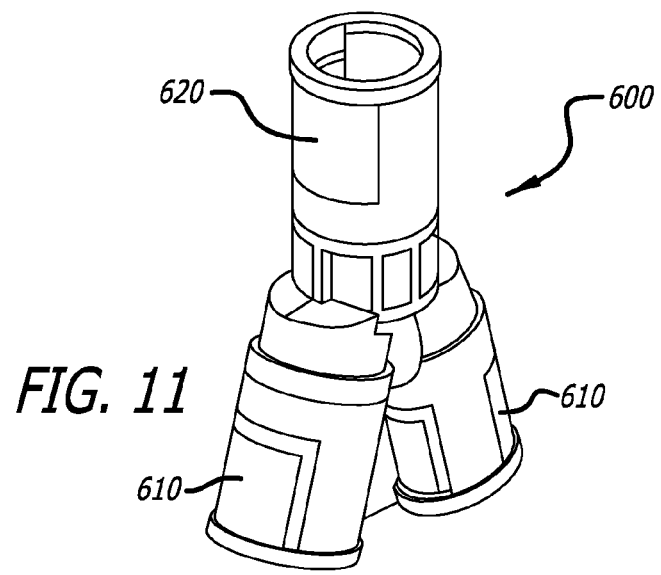
FIG. 11 is a perspective view of the assembled components of FIG. 10.

Alternatively, connection of the tube assembly 300 to a fluid source inlet line or a fluid discharge fixture may be facilitated by a quick connector, such as disclosed in U.S. Pat. No. 7,044,506, which is hereby incorporated by reference. For example, FIGS. 9 and 10 show quick connector assembly 600 in the form of a Y-connector with first and second inlet connectors 610 for connecting two fluid inlet lines and an outlet connector 620 for connecting to one fluid outlet. As further seen in FIG. 1, the second tubes 314 of the tube assemblies 310 that provide hot and cold water are connected to the first and second inlet connectors 610 and the first connecting end 253 of the spout assembly 250 is connected to the outlet connector 620. Thus, complete fluid flow paths are provided from the hot and cold water inlet valves 400 to the delivery spout 210.

Figure 12:
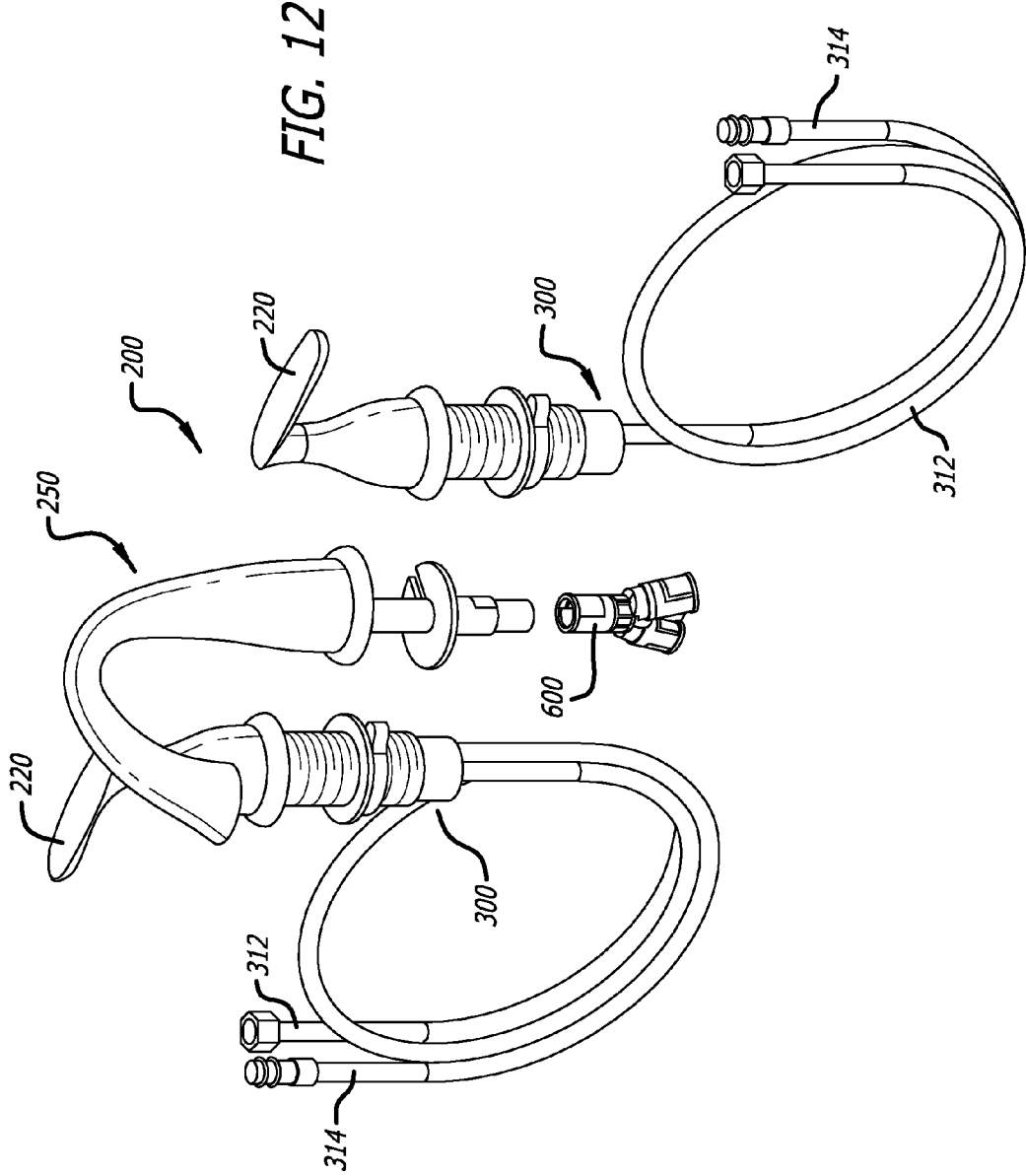
FIG. 12 is another exploded perspective view of the assembly of FIG. 1, with two fluid delivery assemblies shown connected to faucet handles.
Figure 13:
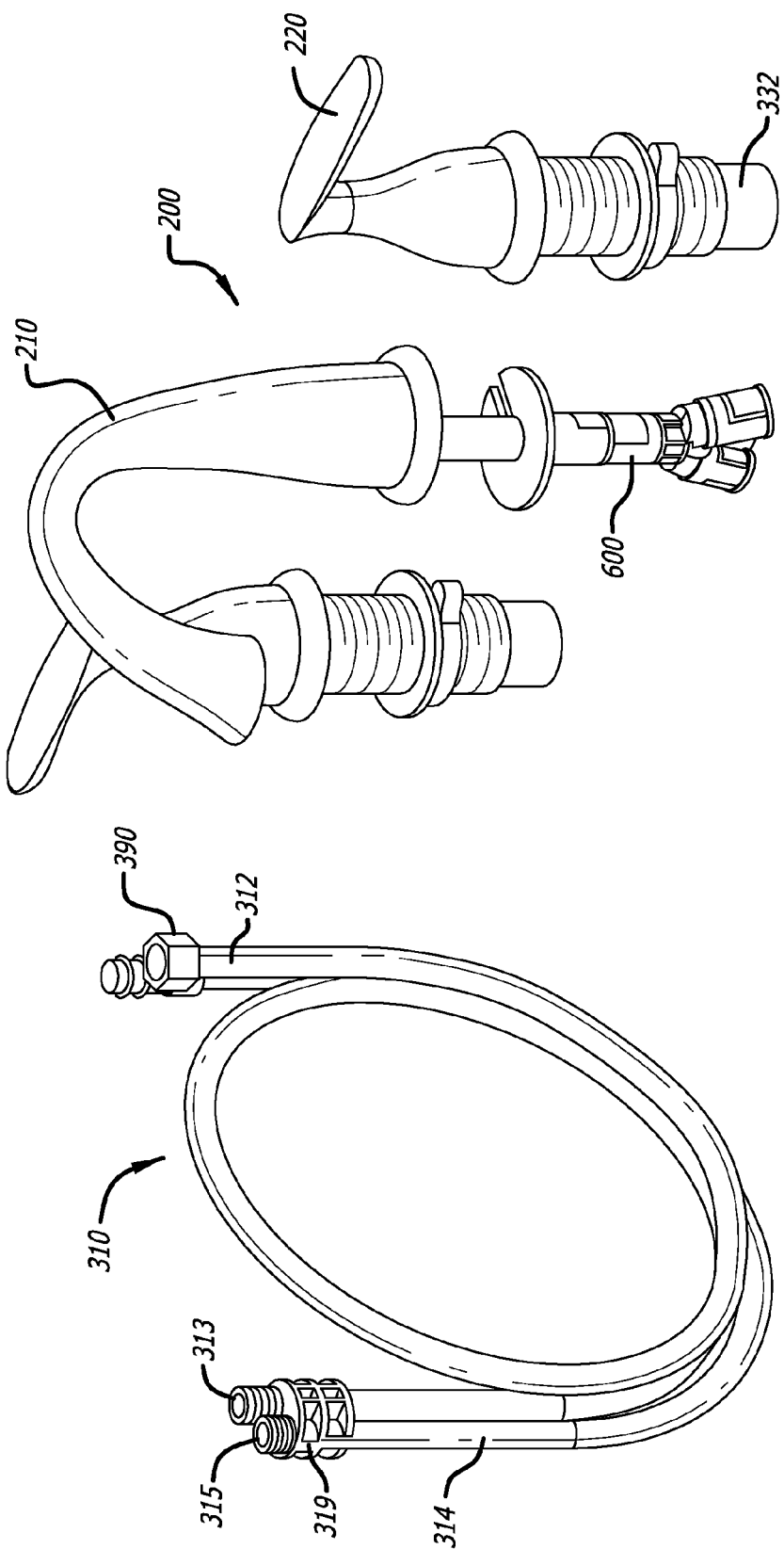
FIG. 13 is another exploded perspective view of the assembly of FIG. 1, with one of the fluid delivery assemblies shown completely unconnected.

FIG. 12 shows two fluid delivery assemblies 300, each connected to a handle 220 of the faucet assembly 200. The second ends of first and second tubes 312, 314 are shown not yet connected to water inlets or the spout assembly 250. As further shown in FIG. 13, tube assembly 310 is a separate component that may be removed and/or replaced without uninstalling any other components of the faucet assembly 200.

Figure 15:
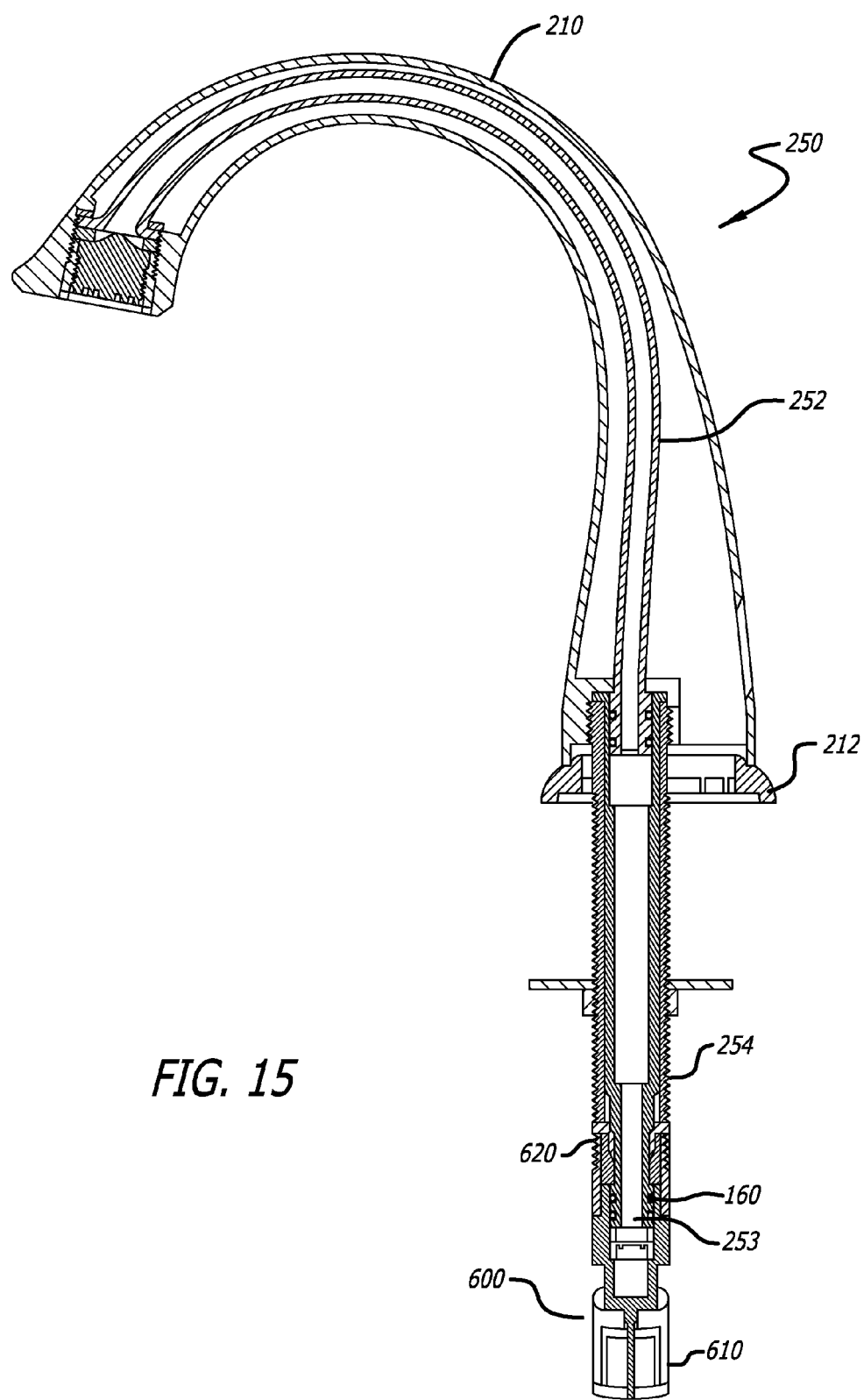
FIG. 15 is a cross-sectional side view of the assembled components of FIGS. 9 and 11.
Figure 16:
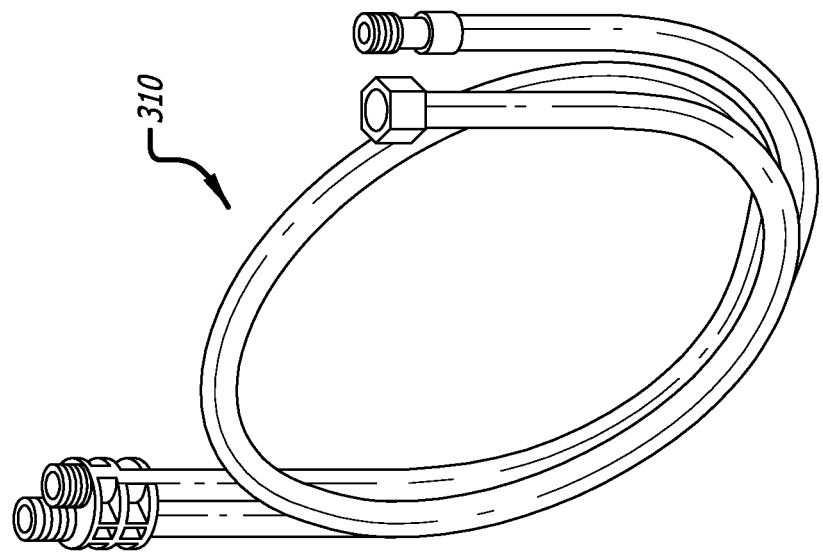
FIG. 16 is a perspective view of two tube assemblies.
Figure 16:
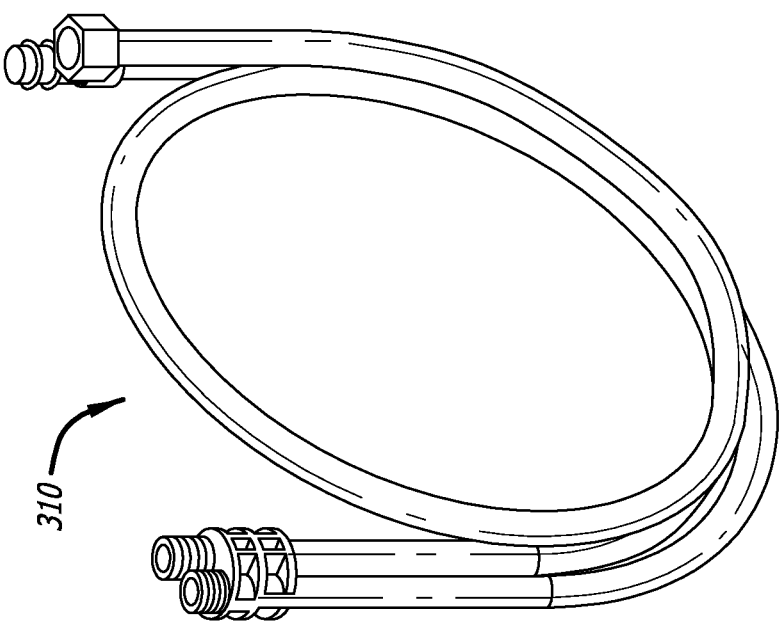

FIG. 14 shows a front cross-sectional view of the faucet system 100. The connections of the fluid delivery assemblies 300 to the handles 220 and the quick connect assembly 600 are made under the countertop 150 by hand without requiring the use of tools. As further shown in FIG. 15, the quick connect assembly 600 is also connected to the spout assembly 250 under the countertop 150 by hand without requiring the use of tools. Thus, the tube assemblies 310 shown in FIG. 16 and the quick connect assembly 600 may be easily disconnected from the faucet assembly 200. Further, any of the two tube assemblies 310 or the quick connect assembly 600 may be individually replaced without replacing any of the other components.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to as falling within the scope of the invention.

The invention claimed is:

1. A fluid delivery assembly for use with a fluid discharge fixture, the fluid delivery assembly comprising:
    a housing comprising at least one fluid inlet and at least one fluid outlet;
    at least one tube assembly defining at least one fluid flow path, wherein a first portion of the tube assembly is configured to connect to a fluid source line, and wherein a second portion of the tube assembly is configured to connect to the housing;
    a retaining assembly to secure the tube assembly and the housing, wherein the retaining assembly is configured to be engaged or disengaged by hand without the use of tools, and wherein the housing, the tube assembly and the retaining assembly are separate components that are not integrally formed together;
    wherein the tube assembly is comprised of PERT plastic tubing and the housing is comprised of plastic;
    and wherein the tube assembly comprises a first tube defining a fluid pathway from a fluid source to the housing; and
    a second tube defining a fluid pathway from the housing to the fluid discharge fixture, wherein a portion of the first tube and a portion of the second tube are molded together.

2. A fluid delivery assembly, for use with a fluid discharge fixture, the fluid delivery assembly comprising:
    a housing comprising at least one fluid inlet and at least one fluid outlet;
    at least one tube assembly defining at least one fluid flow path, wherein a first portion of the tube assembly is configured to connect to a fluid source line, and wherein a second portion of the tube assembly is configured to connect to the housing;
    a retaining assembly to secure the tube assembly and the housing, wherein the retaining assembly is configured to be engaged or disengaged by hand without the use of tools, and wherein the housing, the tube assembly and the retaining assembly are separate components that are not integrally formed together;
    wherein the tube assembly is comprised of PERT plastic tubing and the housing is comprised of plastic;
    wherein the tube assembly comprises a first tube having a first tube end portion and a second tube having a second tube end portion, wherein either the size or the shape of the first tube end portion is different from either the size or the shape of the second tube end portion; and
    wherein the housing comprises a first fluid channel sized and shaped to receive only one of the first tube end portion and the second tube end portion, and a second fluid channel sized and shaped to receive the other of the first tube end portion and the second tube end portion.

3. The fluid delivery assembly of claim 2, wherein a fluid flows from an angle valve of the fluid source line, through the first tube into the housing, from the housing into a fluid flow cartridge, from the fluid flow cartridge into the housing, from the housing into the second tube, and from the second tube to a faucet head.

* * * * *